(12) United States Patent
Wiser et al.

(10) Patent No.: US 8,145,539 B2
(45) Date of Patent: Mar. 27, 2012

(54) METHOD, MEDIUM, AND SYSTEM FOR AUDITING RATES USING DIFFERENT RATE REQUESTS IN A DATABASE

(76) Inventors: Daniel Allen Wiser, Hurst, TX (US); Ty Michael Coburn, Richmond, TX (US); Shawn Glenn Rucker, San Francisco, CA (US)

(*) Notice: Subject to any disclaimer, the term of this patent is extended or adjusted under 35 U.S.C. 154(b) by 114 days.

(21) Appl. No.: 12/575,274

(22) Filed: Oct. 7, 2009

(65) Prior Publication Data

US 2011/0082758 A1 Apr. 7, 2011

(51) Int. Cl.
*G06Q 30/00* (2006.01)

(52) U.S. Cl. .................................................. 705/26.41

(58) Field of Classification Search ............... 705/26.41, 705/26.43, 26.44, 26.42, 26.63, 26.64
See application file for complete search history.

(56) References Cited

U.S. PATENT DOCUMENTS

| | | | |
|---|---|---|---|
| 5,948,040 A | 9/1999 | DeLorme et al. | |
| 7,195,157 B2 | 3/2007 | Swartz et al. | |
| 7,225,249 B1 | 5/2007 | Barry et al. | |
| 7,548,615 B2 * | 6/2009 | Bhalgat et al. | 379/114.14 |
| 7,962,354 B2 * | 6/2011 | Liew et al. | 705/6 |
| 7,979,457 B1 * | 7/2011 | Garman | 707/768 |
| 2002/0107761 A1 * | 8/2002 | Kark et al. | 705/27 |
| 2002/0152100 A1 * | 10/2002 | Chen et al. | 705/5 |
| 2004/0143540 A1 * | 7/2004 | Song | 705/37 |
| 2007/0061174 A1 * | 3/2007 | Phillips | 705/5 |
| 2007/0233528 A1 * | 10/2007 | Jafri et al. | 705/5 |
| 2009/0018996 A1 | 1/2009 | Hunt et al. | |
| 2009/0106170 A1 * | 4/2009 | Thurlow et al. | 705/400 |
| 2009/0240586 A1 | 9/2009 | Ramer et al. | |

FOREIGN PATENT DOCUMENTS

| | | |
|---|---|---|
| WO | WO 00/42543 | 7/2000 |
| WO | WO 2011/043770 A1 | 4/2011 |

OTHER PUBLICATIONS

"Synchronizing a Database to Improve Freshness," ACM SIGMOD Record vol. 29 Issue 2, Jun. 2000.*
Wiser et al., U.S. Appl. No. 12/907,369, filed Oct. 19, 2010, 25 pages (unpublished).
PCT International Search Report mailed on Dec. 14, 2010 for PCT/US10/053154, 10 pages.
PCT International Search Report mailed on Dec. 9, 2009 for PCT/US09/59860.

* cited by examiner

*Primary Examiner* — Yogesh C Garg
*Assistant Examiner* — Matthew Zimmerman

(57) ABSTRACT

Embodiments of the present invention provide a system, method, and computer program product for auditing rates based on server access of databases. In one embodiment, an expected rate is received, and a rate request is sent to a server, wherein the rate request promotes an entry of the rate request to access a database. A rate response is received from the server, wherein the rate response corresponds to the rate request and includes a specified rate. A sale request is sent to the server, wherein the sale request corresponds to the rate request and promotes an entry of the sale request to access the database. A sale response is received from the server, wherein the sale response corresponds to the sale request and includes a sale rate. A message is output based on the expected rate, the specified rate, and/or the sale rate.

38 Claims, 2 Drawing Sheets

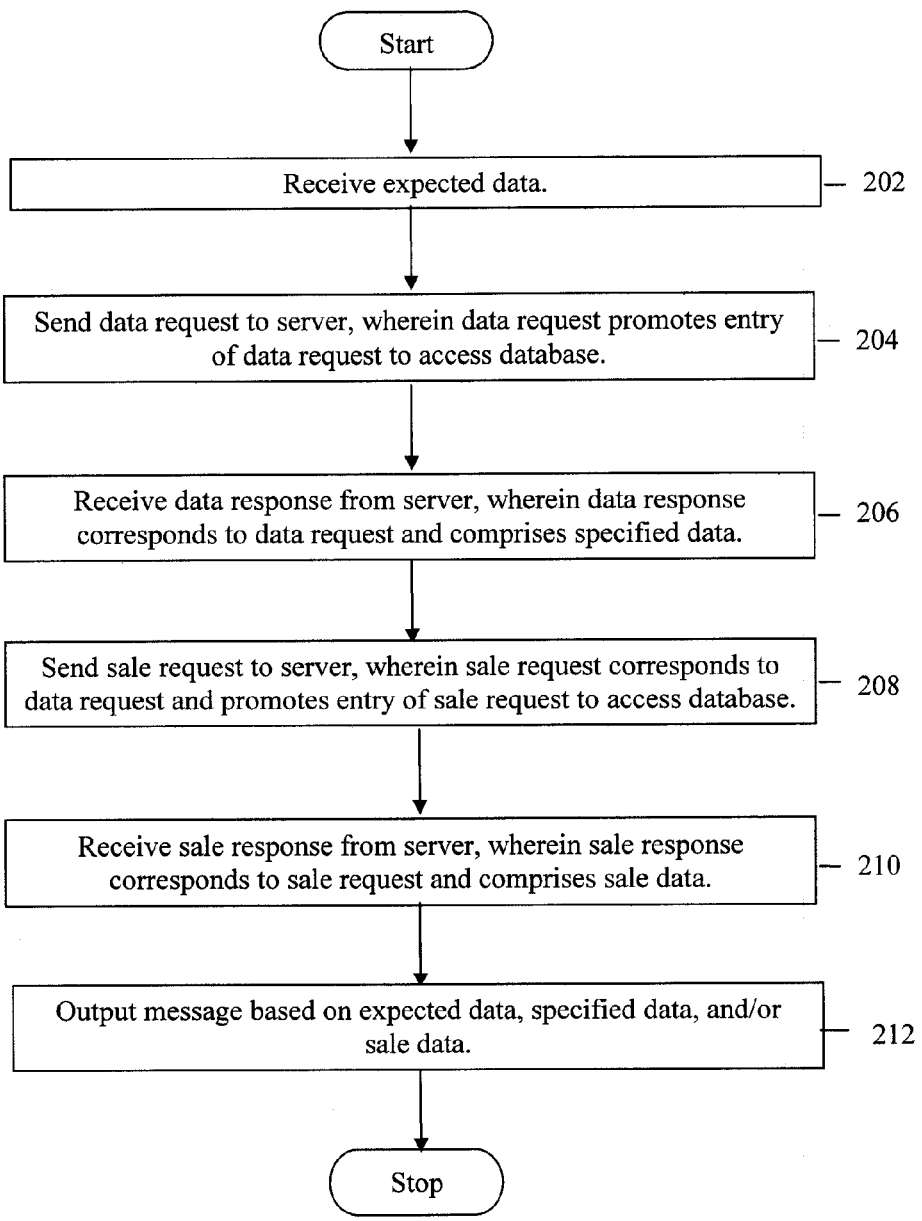

METHOD, MEDIUM, AND SYSTEM FOR AUDITING RATES USING DIFFERENT RATE REQUESTS IN A DATABASE

FIELD OF THE INVENTION

The present invention generally relates to validation of data which has been entered into an information system and relates to product and service providers. More particularly, the invention relates to a system, method, and computer program product for confirming that data has been entered correctly and loaded into a database accessed by a distribution system, thereby reducing occurrences of failing to secure contracted rates for products and/or services.

BACKGROUND

There are a number of inventory management and distribution systems, or global distribution systems, which have been generally adopted by the various product and service industries as standards for providing rate negotiation and/or distribution services to participating customers. For example, in the travel industry there have been a limited number of primary computer based global distribution systems, such as, Sabre, Apollo-Galileo, Amadeus, and Worldspan. While variations exist between the major global distribution systems used within the travel industry, the underlying concept is generally the same in that a global distribution system provides travel agents, corporate travel clients, and in some cases, individual customers, with direct access to travel service provider rates and booking tools. The travel and lodging industry has long relied on travel agents (also known as brokers) to direct customers to their services. The Internet has changed the travel industry by providing a direct channel between the travel services provider and the customer. However, travel agents are still utilized in large part by corporate travelers and those preferring the services of a professional travel agent to ensure that their vacation or business travel is planed thoroughly and that they are receiving the lowest possible rates.

In general, a global distribution system (or a related system) provides brokers with information to help negotiate discounts on behalf of their customers and with travel service providers with whom they would like to conduct business. A global distribution system provides a travel service provider a means to attract repeat business from clients in return for a discounted rate. When a rate is negotiated, it may be the responsibility of the travel service provider to enter the rate data into the global distribution system and/or a computer reservation system.

Due to human error, possible computer errors, and various other reasons, rate data is often not entered correctly or is not properly recorded within a global distribution system itself. As a result, customers may not receive benefit from negotiated discount rates. One limited solution to ensure that rate data has been entered and recorded correctly involves the use of "screen-scraping," in which a rate request is sent to a global distribution system in the form of a data screen request that specifies the location (such as the column and the row) in which the rate is expected to be displayed via the global distribution system's data screen.

SUMMARY OF THE INVENTION

If a data screen that includes a rate is modified (such as a change in the row or column where the rate is located), a screen-scraping request may not correctly return the rate. Additionally, some global distribution systems may access data from remote databases, such as remote databases maintained by computer reservation systems, but the data in the global distribution system may lag behind updates made to data in remote databases. Furthermore, even if a database indicates that a negotiated rate may be available, the database may apply a different set of rules in responding to sale requests than in responding to rate availability requests, such that sales may be based on rates that differ from the rates that the database indicates are available. Consequently, screen-scraping may not be able to audit rates correctly, customers may not receive rate data that is updated in remote databases but not updated in a global distribution system, and customers may not receive benefit from negotiated discount rates. Therefore, it is an object of the present invention to provide a system, a method, and a computer program product for facilitating a more accurate and comprehensive computerized scan of a global distribution system database in order to flag suspicious, incorrect, and/or missing rate data.

It is an object of the present invention to improve the quality of data stored by global distribution systems and/or corresponding databases.

It is an object of the present invention to overcome problems associated with auditing data in a global distribution system.

It is a further object of the present invention to generate messages and reports based on database audits in a manner which will improve accuracy in databases accessed by global distribution systems.

It is a further object of the present invention to submit a sale request to verify whether a corresponding sale response indicates the same rate as indicated by a previous rate availability response.

It is a further object of the present invention to identify certain product and service providers whose data repeatedly indicates audit failures.

It is a further object of the present invention to identify and correct errors in negotiated rates and sale rates so that customers may receive the benefits of negotiated rates.

BRIEF DESCRIPTION OF THE DRAWINGS

FIG. 2 is a flowchart depicting an embodiment of the process of the present invention.

DETAILED DESCRIPTION

Figure 1:
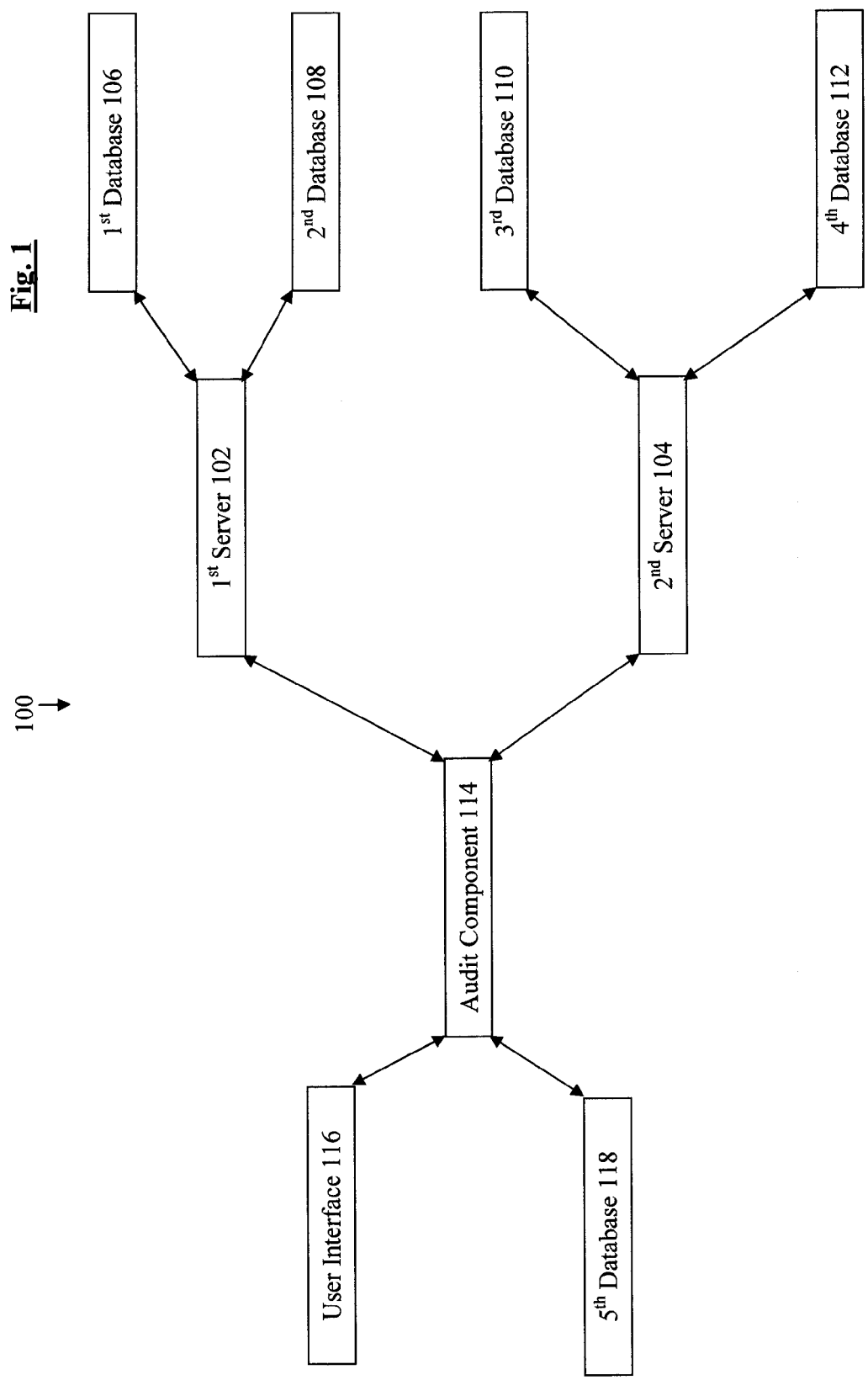
FIG. 1 is a block diagram depicting an embodiment of the system of the present invention.

With reference to FIG. 1, a block diagram depicts the system 100 of the present invention. Although examples in the pending disclosure refer to rates related to travel products and services, the present invention may also be applied to distribution systems related to other types of products and services. The depicted system includes a first server 102, a second server 104, a first database 106, a second database 108, a third database 110, and a fourth database 112. Although FIG. 1 depicts two servers 102-104 and four databases 106-112, the system 100 may include any number of servers 102-104 and any number of databases 106-112. Each of the servers 102-104 may be a global distribution system associated with products and/or services. Each of the databases 106-112 may be a remote database for a computer reservation system indirectly accessed by the servers 102-104, wherein each computer reservation system is associated with products and/or services. Each of the databases 106-112 may also be a local database accessed directly by one of the servers 102-104, such as a global distribution system database. Each of the databases 106-112 may communicate exclusively with one of the servers 102-104. For example, the databases 106-108 may communicate only with the first server 102 while the databases 110-112 may communicate only with the second server 104. Alternatively, some of the databases 106-112 may communicate with more than one of the server 102-104. For example, the second database 108 may communicate with both of the servers 102-104. The system 100 may includes switches (not depicted in FIG. 1) which convert communications in a server format from the servers 102-104 into communications in a database format to the databases 106-112 and convert communications in a database format from the databases 106-112 into communications in a server format to the servers 102-104.

The system 100 also includes an audit component 114, a user interface 116, and a fifth database 118. The system 100 may execute the audit component to audit data via the servers 102-104 and the databases 106-112, output results of such an audit via the user interface 116, and store results of such an audit in the fifth database 118.

With reference to FIG. 2, a flowchart is depicted of the process 200 of the present invention. The process 200 may be implemented by the system 100, a method of the present invention, or a computer program product of the present invention.

In box 202, expected data is optionally received. For example, the audit component 114 receives the expected rate of $100 per night for employees of a corporation to stay in a specific hotel in New York during January. Although the pending application may use a request for a rate as an example, the present invention may request and receive other types of data other than rates. As used herein, a rate may include a price, a cost, a fare, a fee, or a similar value. A rate may be a historic rate, an increasing rate, a decreasing rate, an algorithmic rate, a discounted rate, a negotiated rate, a promotional rate, a seasonal rate, and/or a rate based on certain indices. For example, the New York hotel may offer a discounted rate to a corporation's employees based upon the number of employees that have requested a room and/or the reservation frequency associated with the employees. Although the pending application may use a corporation and its employees as an example, the present invention may send and receive requests related to any type of customer.

The audit component 114 may prompt a user of the system for the expected data, or the audit component 114 may execute box 204 without receiving the expected data. For example, the audit component 114 may prompt the user to enter the expected rate to be used for an audit. In another example, the audit component 114 may execute box 204 without receiving the expected rate from the user because the user requests to audit the rates for their corporation without knowing the expected rate in advance. In some embodiments, the audit component 114 provides a user with a rate form; such as a request for proposal form, and parses the expected rate from the rate form. In this manner, the audit component 114 may facilitate rate negotiations between, for example, a corporation and a hotel chain, and extract the expected rate from a completed rate form.

The audit component 114 may also store the expected data in the fifth database 118, which may be an expected data database, or in any of the other databases 106-112. For example, the audit component 114 may store the expected rates that the corporation has negotiated with each hotel in each city and uses these stored rates for subsequent audits. In another example, a hotel may request for the audit component 114 to store the expected rates negotiated between the hotel and each corporation in the first database 106. Although the pending application may generally refer to the first database 106 and the third database 110, in some examples the first database 106 may be referred to as a remote database 106 and the third database 110 may be referred to as a local database 110.

The audit component 114 may initiate a data request based on a geographic area included in the expected data. For example, the audit component 114 may identify each New York hotel within five miles of a specified New York airport. The geographic area may be based on a specified distance and/or a geographic location selected by a user. For example, a user of the system 100 may input parameters via the user interface 116 that enables the audit component 114 to identify each Chicago hotel within ten miles of a selected Chicago airport.

In box 204, a data request is sent to a server, wherein the data request promotes entry of the data request to access a database. For example, the audit component 114 sends a rate request for the New York hotel during January to the first server 102, wherein the rate request includes extensible markup language (XML) code that emulates a manual entry of a web service request of the rate request when executed by the first server 102. The data request may be based on a specific customer. For example, the data request may request rates from all hotels in a geographic area that list rates for a specific corporation. The data request may be initiated on behalf of a specific customer and/or a data provider. For example, the audit component 114 may conduct an audit on behalf of a specific corporation for all hotels in a geographic area that list rates for the specific corporation. If the audit component is to send data requests to both of the servers 102-104, the audit component 114 may send the data requests to the servers 102-104 consecutively (in serial) or concurrently or simultaneously (in parallel).

The data request may include an identifier and/or access information associated with a system user. For example, the rate request may specify each of the corporate identifiers used by a corporation in negotiations to request rates specifically negotiated for the corporation. The audit component 114 may compile the list of corporate identifiers by parsing and extracting each corporate identifier from each of the rate request forms associated with the corporation, such as <Lanyon Inc.>, <Lanyon>, and <Lany> for Lanyon Inc. Alternatively, identifiers may be developed or received in any number of methods before being employed in a data request. In another example, the rate request may include a password for a corporation to request confidential rates specifically negotiated for the corporation. In yet another example, the rate request may specify each of the identifiers and passwords associated with a hotel chain that owns the New York hotel if the hotel chain is requesting an audit of the rates its hotels are offering.

The data request may specify multiple dates, and the multiple dates may be associated with multiple months. For example, the audit component 114 receives a request from the user to verify that the corporation may receive the negotiated rate of $100 in the New York hotel around January $14^{th}$. However, in addition to requesting the New York hotel's room rate for the corporation on January $14^{th}$, the audit component 114 may also request the New York hotel's room rate for January $13^{th}$, the day before the specified date, for January $15^{th}$, the day after the specified date, January $7^{th}$, one week before the specified date, and January $21^{st}$, one week after the specified date. Therefore, the audit component 114 may assure the requesting user that any results of the rate audit are more representative of the rates specified by the New York hotel for the corporation in January than a statistical anomaly. Furthermore, the audit component 114 may also request rates for other months than the specified month, such as requesting the rates provided by the New York hotel for the corporation for February 14$^{th}$ and March 14$^{th}$ as well. Such a seasonal verification may enable the requesting user to determine whether the rates verified for the specified month are also representative of rates for similar months. In another example, the audit component 114 receives a request from the user to verify that the corporation may receive the negotiated rate of $100 in the New York hotel during a range of dates from February 15$^{th}$ to April 3$^{rd}$.

In box 206, a data response is received from a server, wherein the data response corresponds to a data request and includes specified data. For example, the audit component 114 receives a rate response from the first server 102, wherein the rate response corresponds to the rate request for the rate provided by the New York hotel during January to the corporation and the response specifies a rate of $100 per night. The data response may include information associated with a product and/or a service. For example, the rate response may specify that the rate of $100 per night is available to the corporation's employees for a non-smoking room with two double beds on January 14$^{th}$. The data response may be based on the identifier and/or the access information associated with the user. For example, the first server 102 may provide the rate response only for hotel rooms available for the corporation and may provide the rate response as confidential information that is only accessible when the rate request includes the corporation's access enabling information.

In box 208, a sale request is sent to a server, wherein the sale request corresponds to a data request and promotes entry of the sale request to access a database. For example, the audit component 114 sends a sale request to the first server 102, wherein the sale request corresponds to the previous rate request and includes code, such as extensible markup language (XML) code, which emulates a manual entry of a web service request of the sale request when executed by first server 102. The audit component 114 received the rate response indirectly from the remote database 106, and the audit component 114 may send the sale request indirectly to the remote database 106 because the remote database 106 may include different logic for processing sale requests than for processing rate requests. For example, although the remote database 106 may specify that a room in the New York hotel is available to the corporation's employees on January 14$^{th}$ at a rate of $100 per night based on prior negotiations, additional rules in the remote database 106 may not permit for any rooms in the New York hotel to be sold below $120 on January 14$^{th}$ due to blackout rules, a high occupancy rate, or other rules. Alternatively, the remote database 106 may indicate that a room in the New York hotel is available to be sold at $100 on January 14$^{th}$ to one of the corporation's employees, but the rules may specify that no cancellation or refund may be available due to blackout rules or a high occupancy rate. Verifying that the negotiated rate is the sale rate may be important for product or service providers because of customer frustration based on mismatched rates in the past. Similar to the rate request, the sale request may include multiple dates associated with multiple months, and an identifier and/or access information associated with a system user.

By sending the sale request to the first server 102, the audit component 114 may promote the creation of a sale or a suspended-state sale. A suspended-state sale may be a sale that requires receipt of an additional confirmation to be converted into a conventional sale. For example, when the audit component 114 sends the sale request to the first server 102, either the first server 102 or the remote database 106 creates a suspended-state sale of $100 for a room in the New York hotel on January 14$^{th}$. Subsequently, the audit component 114 may send a release request to the first server 102 to promote release or cancellation of the sale or the suspended-state sale. For example, when the audit component 114 sends a release request to the first server 102, either the first server 102 or the remote database 106 releases the suspended-state sale of $100 for the room in the New York hotel on January 14$^{th}$. As one skilled in the art will recognize, a release may be any action that cancels a sale or suspended-state sale, ignores steps required to confirm a sale or suspended-state sale, prevents consummation of a sale or suspended-state sale, and/or allows the sold or suspended-state inventory to be made available again. A release request may be any transmission that promotes a release of a sale or suspended-state sale, and may be a cancellation request or an ignore request.

In box 210, a sale response is received from a server, wherein the sale response corresponds to a sale request and includes sale data. For example, the audit component 114 receives the sale response from the first server 102, wherein the sale response corresponds to the sale request and includes the sale rate of $100 per night in the New York hotel. Similar to the data response, the sale response may include information associated with a product and/or a service. Similar to the data response, an identifier and/or access information may enable the sale response to include information associated with products and/or services. The sale response may include a confirmation identifier, which, as discussed below, enables the user to verify that the requested sale has been confirmed by the remote database 106 and not independently by the first server 102.

In box 212, a message is output based on expected data, specified data, and/or sale data. For example, the audit component 114 outputs a message based on comparing the expected rate to the specified rate, comparing the specified rate to the sale rate, and/or comparing the expected rate to the sale rate. The audit component 114 may base comparisons of data on any combination of exact matches or proximate matches, such as whether a rate for a requested room is or is not based on the room having two double beds and whether the monetary values for compared rates are within a range based on a fluctuating currency exchange. In this manner, the audit component 114 may output the results of an audit to the user that requested the audit. For example, the message specifies that the user expects rooms to be available to the corporation's employees at a rate of $100 per night in the New York hotel on January 14$^{th}$, and that the remote database 106 indicates that the New York hotel has a rate of $100 per night available to the corporation's employees for January 14$^{th}$. In another example, the message specifies that the remote database 106 indicates that rooms are available to the corporation's employees at a rate of $100 per night in the New York hotel on January 14$^{th}$, and that the remote database 106 reserves a room for one of the corporation's employees in the New York hotel at a rate of $100 per night available for January 14$^{th}$. In yet another example, the message specifies that that the user expects rooms to be available to the corporation's employees at a rate of $100 per night in the New York hotel on January 14$^{th}$, and the remote database 106 indicates that the New York hotel has a rate of $100 per night available to the corporation's employees for January 14$^{th}$, but the remote database 106 reserves a room for one of the corporation's employees in the New York hotel at a rate of $120 per night for January 14$^{th}$. Alternatively, the message may simply provide a pass/fail indication based on a set threshold, such as failure if a sale rate or specified rate is higher than expected and pass if a sale rate or a specified rate is as expected or lower than expected.

The audit component 114 may output the message to a user associated with a potential sale, a user associated with the remote database 106, and/or a list of recipients specified by a user. For example, the audit component 114 may output a message to the corporation indicating that the audit confirms the expected price of $100 per night and reserves a room at the rate of $100 per night in the New York hotel for January $14^{th}$. In another example, the audit component 114 outputs a message to the New York hotel specifying that although the New York hotel negotiated a rate of $100 per night for the corporation's employees in January and the hotel's remote database 106 indicates that rooms are available to the corporation's employees at a rate of $100 per night on January $14^{th}$, the remote database 106 reserved a room for one of the corporation's employees at a rate of $120 per night instead. In response to receipt of such messages, the corporation and/or the hotel may initiate appropriate actions, such as informing their employees of the confirmation of negotiated rates or taking corrective measures to identify why the room was reserved at a rate that differs from the negotiated rate.

The message may indicate the presence or absence of a confirmation identifier and/or a time delay beyond a threshold value in receiving the sale response from the first server 102. For example, if the first server 102 loses communication with the remote database 106, the first database 102 may continue attempting to communicate with the remote database 106 for a predetermined amount of time before processing any sale requests based on the most recently cached data for the remote database 106, and wait until communication is restored to convey the sale requests to the remote database 106. However, in this situation the first server 102 cannot provide a sale confirmation identifier that is provided by the remote database 106 to confirm the sale. Even when communication is restored, the remote database 106 may not respond to the sale request with the same rate as the rate offered in the response to the sale request by the first server 102. Therefore, the audit component 114 may treat either the absence of the confirmation identifier or a specific time delay in responding to the sale request as an indication that the first server 102 has lost communication with the remote database 106, such that the remote database 106 may not reflect any response to the sale request.

The audit component 114 may also send the data request and/or the sale request to the servers 102-104; receive the data response and/or the sale response from the servers 102-104, and output a report based on receiving the data response and/or the sale response from servers 102-104. For example, the audit component 114 may output a comprehensive report for the corporation based on sending and receiving requests via the servers 102-104 and the databases 106-112 to confirm the corporation's negotiated rates with each hotel with which the corporation has negotiated a rate. The audit component 114 may include separate components for communicating with each of the servers 102-104, such as a first dedicated component for communicating with the first server 102 and a second dedicated component for communicating with the second server 104.

The report may include any information related to verification of rates, missing rates, statistics, and or other inaccuracies identified in an audit conducted via one or more of the servers 102-104. Although each of the servers 102-104 may respond with data in different formats, the audit component 114 may provide the report in a standardized format that does not differentiate between the different data formats provided by the servers 102-104. The report may be output in the form of a printed report, web access to the report, graphs, real-time information, raw data, batch information, and/or similar types of reports. The audit component 114 may output the report in a format that enables a system user to modify, filter, and/or delete data in the report, query the data in the report, extract data from the report, and convey the report and/or extracted data to various user interface screens and/or webpages, as specified by the user of the system 100. Furthermore, access to portions of the report and/or extracted data may be available to various users based on corresponding security levels associated with the users, thereby requiring the users to enter access enabling information, such as usernames and passwords.

The audit component 114 may enable a user to customize the report and/or the message. For example, the audit component may enable the requesting user to specify the format of data in the report, such as which data is provided, where it is located on the report, and how each instance of data is described. Furthermore, the audit component 114 may enable the requesting user to specify how data in the reports may be formatted for storage.

The audit component 114 may also store the data response, the sale response, and/or the report as historical data in the fifth database 118, and compare any current data with historical data in the fifth database 118. For example, the current data may indicate that the New York hotel reserved the room for one of the corporation's employees at a rate of $120 per night in January instead of the negotiated rate of $100 per night, and the historical data may indicate that the New York hotel reserved the room for one of the corporation's employees at a rate of $120 per night in December instead of the negotiated rate of $100 per night. This information may be provided to a provider for useful analysis or a user may review its historical data to determine which providers are more statistically correct in order to minimize hassles and/or overcharges.

The audit component 114 may send the specified data and/or the sale data to the first server 102 prior to sending the data request to the first server 102. For example, the audit component 114 may initially send data to the first server 102 on behalf of the hotel and/or the corporation prior to conducting any audit of the data.

The audit component 114 may also send corrective data to the first server 102 if a comparison indicates that the specified data is greater than the expected data, the sale data is greater than the specified data, and/or the sale data is greater than the expected data. For example, the audit component 114 may determine that the remote database 106 identifies a rate of $100 per night for one of the corporation's employee in the New York hotel on January $14^{th}$, and that the remote database 106 identifies a sale rate of $120 per night for the employee in the New York hotel on January $14^{th}$. In this situation, the New York hotel may allow the audit component 114 to update the remote database 106 to correct the sale rate of $120 per night to reflect the specified rate of $100 per night.

The audit component 114 may also enable a system user to instruct the audit component 114 to re-execute a previous audit. For example, a system user may instruct the audit component 114 to re-execute an audit previously specified and executed one month ago to determine if the New York hotel corrected the problems identified during the previous audit. Additionally, the audit component 114 may enable a system user to schedule the audit component 114 to execute on a scheduled basis. For example, a system user may schedule the audit component 114 to execute on the next Friday or the first Monday of each month.

The invention being thus described, it will be obvious that the same may be varied in many ways. Such variations are not to be regarded as a departure from the spirit and scope of the invention and all such modifications as would be obvious to one skilled in the art are intended to be included within the scope of the system, method, or computer program product described.

The invention claimed is:

1. A system for data audits, the system comprising:
 a processor;
 a memory; and
 an audit component stored in the memory, wherein said audit component is executed by said processor and configured to:
 a) Send a request for a rate to a database through a server, wherein said rate request promotes an entry of said rate request to access the database, and wherein said rate request is for at least one of a travel reservation, a transportation service, a shipping service, a healthcare service, an energy service, and a hospitality service;
 b) Receive a rate response from said server, wherein said rate response corresponds to said rate request and comprises a specified rate;
 c) Send a request for a sale rate to the database through said server, wherein said sale rate request corresponds to said rate request and promotes an entry of said sale rate request to access said database, and wherein said sale rate request is for at least one of said travel reservation, said transportation service, said shipping service, said healthcare service, said energy service, and said hospitality service;
 d) Receive a sale response from said server, wherein said sale response corresponds to said sale rate request and comprises the sale rate;
 e) Compare said specified rate and said sale rate to determine whether the sale rate is at least one of greater than or less than the specified rate; and
 f) Create a message in response to the determination whether the sale rate is at least one of greater than or less than the specified rate and including within the message an instruction that at least one of the sale rate or the specified rate is incorrect.

2. The system of claim 1 wherein said database comprises a plurality of databases.

3. The system of claim 1 wherein at least one of said rate request and said sale rate request comprises code that emulates a manual entry of a web service request when executed by said server.

4. The system of claim 3 wherein said code comprises extensible markup language (XML) code.

5. The system of claim 1 wherein at least one of said rate request and said sale rate request comprises an identifier associated with a system user, and wherein at least one of said rate response and said sale response is based on said identifier.

6. The system of claim 5 wherein said identifier enables at least one of said rate response and said sale response to comprise information associated with at least one of products, services, travel packages, hotel reservations, rental car reservations, airline reservations, train reservations, bus reservations, and cruise reservations.

7. The system of claim 1 wherein at least one of said rate request and said sale rate request comprise access information associated with a system user, and wherein said server responds to at least one of said rate request and said sale rate request based on said access information.

8. The system of claim 7 wherein said access information enables said server to respond to at least one of said rate request and said sale rate request with information associated with at least one of products, services, travel packages, hotel reservations, rental car reservations, airline reservations, train reservations, bus reservations, and cruise reservations.

9. The system of claim 1 wherein at least one of said rate request and said sale rate request comprise a request associated with a plurality of dates.

10. The system of claim 9 wherein said plurality of dates are associated with a plurality of months.

11. The system of claim 1 wherein at least one of said rate response and said sale response comprise a description of at least one of a product, a service, a travel package, a hotel reservation, a rental car reservation, an airline reservation, a train reservation, a bus reservation, and a cruise reservation.

12. The system of claim 1 wherein said server comprises a global distribution system associated with at least one of a product, a service, a travel service, said hospitality service, said shipping service, a trucking service, a parcel delivery service, a healthcare provider, and an energy provider.

13. The system of claim 1 wherein said database comprises at least one of a database accessed directly by said server and a remote database accessed indirectly by said server.

14. The system of claim 1 wherein said database is associated with a computer reservation system that is associated with at least one of travel packages, hotel reservations, rental car reservations, airline reservations, train reservations, bus reservations, and cruise reservations.

15. The system of claim 1 wherein said sale response comprises a confirmation identifier, and wherein said message comprises said confirmation identifier.

16. The system of claim 1 wherein sending said sale rate request to said server promotes creation of a suspended-state sale.

17. The system of claim 16 wherein said audit component is further executed by said processor to send a release request to said server, wherein said release request promotes release of said suspended-state sale.

18. The system of claim 1 wherein sending said sale rate request to said server promotes creation of a sale and wherein said audit component is further executed by said processor to send a release request to said server, wherein said release request promotes release of said sale.

19. The system of claim 1 wherein said audit component is further executed by said processor to enable a system user to schedule said audit component to execute on a scheduled basis.

20. A method for rate audits, the method comprising:
 a) Sending a request for a rate to a database through a server, wherein said rate request promotes an entry of said rate request to access the database, and wherein said rate request is for at least one of a travel reservation, a transportation service, a shipping service, a healthcare service, an energy service, and a hospitality service;
 b) Receiving a rate response from said server, wherein said rate response corresponds to said rate request and comprises a specified rate;
 c) Sending a request for a sale rate to the database through said server, wherein said sale rate request corresponds to said rate request and promotes an entry of said sale rate request to access said database, and wherein said sale rate request is for at least one of said travel reservation, said transportation service, said shipping service, said healthcare service, said energy service, and said hospitality service;
 d) Receiving a sale response from said server, wherein said sale response corresponds to said sale rate request and comprises the sale rate;

e) Auditing by an electronic processor said specified rate and said sale rate to determine whether the sale rate is at least one of greater than or less than the specified rate; and f) Creating a message in response to the determination whether the sale rate is at least one of greater than or less than the specified rate and including within the message an instruction that at least one of the sale rate or the specified rate is incorrect.

21. The method of claim 20 wherein at least one of said rate request and said sale rate request comprises an identifier associated with a system user, and wherein at least one of said rate response and said sale response is based on said identifier.

22. The method of claim 20 wherein sending said sale rate request to said server promotes creation of a sale and wherein said audit component is further executed by said processor to send a release request to said server, wherein said release request promotes release of said sale.

23. The method of claim 20 wherein at least one of said rate request and said sale rate request comprises a geographic area.

24. The method of claim 23 wherein said geographic area is based on a specified distance and a geographic location, wherein at least one of said specified distance and said geographic location is selectable by a user.

25. A tangible computer readable storage medium storing computer executable program code that, when executed by a processor, causes said computer executable program code to perform a method comprising:

a) Sending a request for a rate to a database through a server, wherein said rate request promotes an entry of said rate request to access the database, and wherein said rate request is for at least one of a travel reservation, a transportation service, a shipping service, a healthcare service, an energy service, and a hospitality service;

b) Receiving a rate response from said server, wherein said rate response corresponds to said rate request and comprises a specified rate;

c) Sending a request for a sale rate to the database through said server, wherein said sale rate request corresponds to said rate request and promotes an entry of said sale rate request to access said database, and wherein said sale rate request is for at least one of said travel reservation, said transportation service, said shipping service, said healthcare service, said energy service, and said hospitality service;

d) Receiving a sale response from said server, wherein said sale response corresponds to said sale rate request and comprises the sale rate;

e) Auditing said specified rate and said sale rate to determine whether the sale rate is at least one of greater than or less than the specified rate; and f) Creating a message in response to the determination whether the sale rate is at least one of greater than or less than the specified rate and including within the message an instruction that at least one of the sale rate or the specified rate is incorrect.

26. The tangible computer readable storage medium of claim 25 wherein said method further comprises receiving an expected rate.

27. The tangible computer readable storage medium of claim 26 wherein said message further comprises a result based on at least one of comparing said expected rate to said specified rate and comparing said expected rate to said sale rate.

28. The tangible computer readable storage medium of claim 26 wherein said message further sends corrective data to said server based on at least one of said auditing or a comparison that indicates that at least one of the specified rate is greater than the expected rate and the sale rate is greater than the expected rate.

29. The tangible computer readable storage medium of claim 25 wherein said database comprises a remote database, and wherein said message is output to at least one of a user associated with a potential sale and a user associated said remote database.

30. The tangible computer readable storage medium of claim 25 wherein said method further comprises storing at least one of said rate response and said sale response as historical data in a database.

31. The tangible computer readable storage medium of claim 25 wherein said message indicates at least one of an absence of a confirmation identifier and a time delay beyond a threshold value in receiving said sale response from said server.

32. The tangible computer readable storage medium of claim 25 wherein said method further comprises:

a) Sending at least one of said rate request and said sale request to a plurality of servers that comprise said server; and b) Receiving at least one of said rate response and said sale response from said plurality of servers.

33. The tangible computer readable storage medium of claim 32 wherein said message comprises a report based on receiving at least one of said rate response and said sale response from a combination of said plurality of servers.

34. The tangible computer readable storage medium of claim 33 wherein said method further comprises enabling a user to customize said report.

35. The tangible computer readable storage medium of claim 33 wherein said method further comprises storing said report as historical data in a database for comparison to subsequent reports.

36. The tangible computer readable storage medium of claim 33 wherein said method further comprises comparing said report with historical data in a database.

37. The tangible computer readable storage medium of claim 25 wherein said method further comprises enabling a user to customize said message.

38. The tangible computer readable storage medium of claim 25 wherein said method further comprises sending at least one of said specified rate and said sale rate to said server prior to sending said rate request to said server.

* * * * *